United States Patent [19]

Henry et al.

[11] Patent Number: 5,491,633
[45] Date of Patent: Feb. 13, 1996

[54] POSITION SENSOR FOR ELECTROMECHANICAL SUSPENSION

[75] Inventors: Rassem R. Henry, Clinton Township; Bruno P. B. Lequesne, Troy; Thaddeus Schroeder, Rochester Hills, all of Mich.

[73] Assignee: General Motors Corporation, Detroit, Mich.

[21] Appl. No.: 390,916

[22] Filed: Feb. 17, 1995

Related U.S. Application Data

[63] Continuation of Ser. No. 115,610, Sep. 3, 1993, abandoned, which is a continuation-in-part of Ser. No. 702,873, May 20, 1991, Pat. No. 5,276,621, Ser. No. 702,874, May 20, 1991, and Ser. No. 702,875, May 20, 1991.

[51] Int. Cl.$^6$ .............................. G06F 7/700; G01B 5/30; F16H 27/02
[52] U.S. Cl. .............................. 364/424.05; 364/551.01; 364/506; 364/709.11; 74/89.15; 74/424.8 C; 74/89; 74/106; 74/25; 74/108; 74/520; 74/216.3
[58] Field of Search .............................. 364/551.01, 506, 364/709.11, 424.05, 424.01, 505, 508, 551.02, 560–562, 137; 74/89.15, 424.8 C, 424.8 R, 89, 106, 520, 25, 107, 567, 216.3, 108, 57, 29; 251/58, 60; 73/866.1, 510, 715, 716; 192/93 R; 280/707, 711, 689, 709, 84, 840

[56] References Cited

U.S. PATENT DOCUMENTS

| | | | |
|---|---|---|---|
| 3,583,202 | 6/1971 | Stanley | 74/25 |
| 3,589,202 | 6/1971 | Stanley | 74/25 |
| 3,952,604 | 4/1976 | Baudler | 74/57 |
| 3,998,179 | 12/1976 | Dieterich et al. | 73/866.1 |
| 4,050,319 | 1/1977 | Stanley | 74/85.15 |
| 4,133,215 | 1/1979 | Norris et al. | 74/89 |
| 4,134,306 | 1/1979 | Grotness et al. | 74/29 |
| 4,324,148 | 4/1982 | Sildve | 74/108 |
| 4,325,535 | 4/1982 | Foster | 251/58 |
| 4,387,781 | 6/1983 | Ezell et al. | 180/65 |
| 4,718,291 | 1/1988 | Wood et al. | 74/89.15 |
| 4,726,453 | 2/1988 | Obstfelder et al. | 188/319 |
| 4,745,820 | 5/1988 | Benshoff et al. | 74/107 |
| 4,815,575 | 3/1989 | Murty | 188/299 |
| 4,892,328 | 1/1990 | Kurtzman et al. | 280/707 |
| 5,033,033 | 7/1991 | Lees, Sr. | 364/506 |
| 5,086,861 | 2/1992 | Peterson | 180/79.1 |
| 5,091,679 | 2/1992 | Murty et al. | 318/153 |
| 5,115,406 | 5/1992 | Zatezalo et al. | 364/551.01 |
| 5,187,992 | 2/1993 | Bald | 74/89.15 |

FOREIGN PATENT DOCUMENTS

| | | |
|---|---|---|
| 0114757 | 8/1984 | European Pat. Off. . |
| 0363158 | 11/1990 | European Pat. Off. . |
| 1636937 | 3/1991 | U.S.S.R. . |
| 89/00512 | 1/1989 | WIPO . |

OTHER PUBLICATIONS

"Method of Manufacturing a Multi–Track Encoder Wheel For Brushless Motors," *Research Disclosure*, No. 33824, Jun. 1992, p. 442.

Primary Examiner—Kevin J. Teska
Assistant Examiner—Jacques H. Louis-Jacques
Attorney, Agent, or Firm—Anthony L. Simon

[57] ABSTRACT

An apparatus comprising a rotating element, a rotary to linear converter, a linearly moving element that linearly extends and retracts when the rotating element rotates in first and second directions, a rotary sensor assembly, integrally constructed with the rotating element, for determining relative movement of the rotating element and for thereby determining relative movement of the linearly moving element, a linear sensor assembly, integrally constructed with the linearly moving element, for providing an absolute position signal each time that the linearly moving element extends or retracts to a predetermined position.

5 Claims, 6 Drawing Sheets

SCREW DISPLACEMENT

POSITION SENSOR FOR ELECTROMECHANICAL SUSPENSION

This is a continuation of application Ser. No. 08/115,610 filed on Sep. 3, 1993 now abandoned, which is a continuation-in-part of U.S. patent applications, Ser. Nos. 07/702,873 now U.S. Pat. No. 5,276,621, and 07/702,874, 07/702,875 both pending, all filed May 20, 1991 and assigned to the assignee of this invention and all having disclosures incorporated herein by reference. The subject of this application is related to the subject of copending application, U.S. Ser. No. 08/115,604, filed concurrently with this application, assigned to the assignee of this invention and the disclosure of which is incorporated herein by reference.

BACKGROUND OF THE INVENTION

In controlling active and semi-active automotive suspension systems, a position sensor is typically required to provide the controller with information regarding the position of the wheel with respect to the car body, which usually has a displacement range of several inches. The velocity of the relative displacement between the car body and the wheel is also typically required by the suspension controller, but can be obtained by differentiation of the position signal, or, preferably, by using an estimator.

Currently available position sensors include (a) LVDT's, which are an expensive option for mass production applications, (b) resistive potentiometers, which are subject to wear because of their sliding contact surfaces and (c) optical sensors, which are subject to contamination, are temperature limited and are relatively expensive. Magnetoresistive technology may be used to sense linear position but typically its application is avoided due to the requirement of temperature compensation.

SUMMARY OF THE PRESENT INVENTION

Advantageously, this invention provides a method and apparatus for sensing position of electromechanical automotive suspension system. This invention provides a sensor method and apparatus for use with actuators comprising a brushless motor or rotary alternator engaged with a rotary-to-linear converter, which consists of either a rotating nut and translating screw or a rotating screw and translating nut. Advantageously, the sensor according to this invention comprises an integral part of the suspension mechanism, facilitating assembly, reducing the number of external wires and providing a low cost high reliability option.

Advantageously, according to this invention, the brushless motor includes a rotary encoder to provide an indication of motor rotation and therefore of linear travel. Since the rotary encoder cannot provide absolute position information because it cannot distinguish one motor revolution from another, it is limited to measuring relative displacement with respect to an initial point, which is subject to drift over time. Therefore, according to this invention, a sensor assembly providing at least one reference position is mounted across an air gap from the linearly translating portion of the suspension. The sensor assembly, the rotary encoder and the suspension actuator comprise an integral unit that provides a controllable variable damper/actuator, including a rotor position sensor for providing a relative movement signal and an absolute position sensor for providing an absolute position signal each time that the actuator is extended to a predetermined position. Thus, the rotary encoder provides relative movement signals that may be counted to update the relative displacement of the actuator, and the absolute position sensor provides a signal, that allows periodic correction of the relative displacement to correct for possible drift.

In a preferred implementation, the sensor assembly includes two separate sensors mounted across an air-gap from the linearly translating portion of the suspension. The two sensors are electronically configured into a bridge circuit. Two specific locations of the translating members each include a small groove for triggering one of the sensors. One groove triggers one sensor each time that the actuator extends to a first reference position and the second groove triggers the second sensor each time that the actuator extends to a second reference position. The sensor system according to this invention is integrated into the electromechanical actuator itself, thus eliminating the need for externally mounted sensors. Thus, the sensor system for the suspension unit includes both a rotary sensor for sensing relative displacement and first and second absolute position sensors for sensing first and second absolute positions of the suspension system.

A more detailed description of this invention, along with various embodiments thereof, is set forth below.

DETAILED DESCRIPTION OF THIS INVENTION

In the description below, the following nomenclature is used: A vehicle quarter car suspension has a "relative displacement," which is representative of the distance between the sprung mass (vehicle body) and the unsprung mass (wheel). Each relative displacement position of the quarter car suspension corresponds to a position of extension (or retraction) of the variable force actuator. "Relative movement" of the actuator is determined based on counting pulses, ideally beginning with a known relative position of the actuator, and allows for tracking of the relative displacement based on counting of the relative movement signals. An "absolute position" of the actuator is determined by an absolute position signal and provides relative displacement information based on an absolute position signal.

Figure 1:
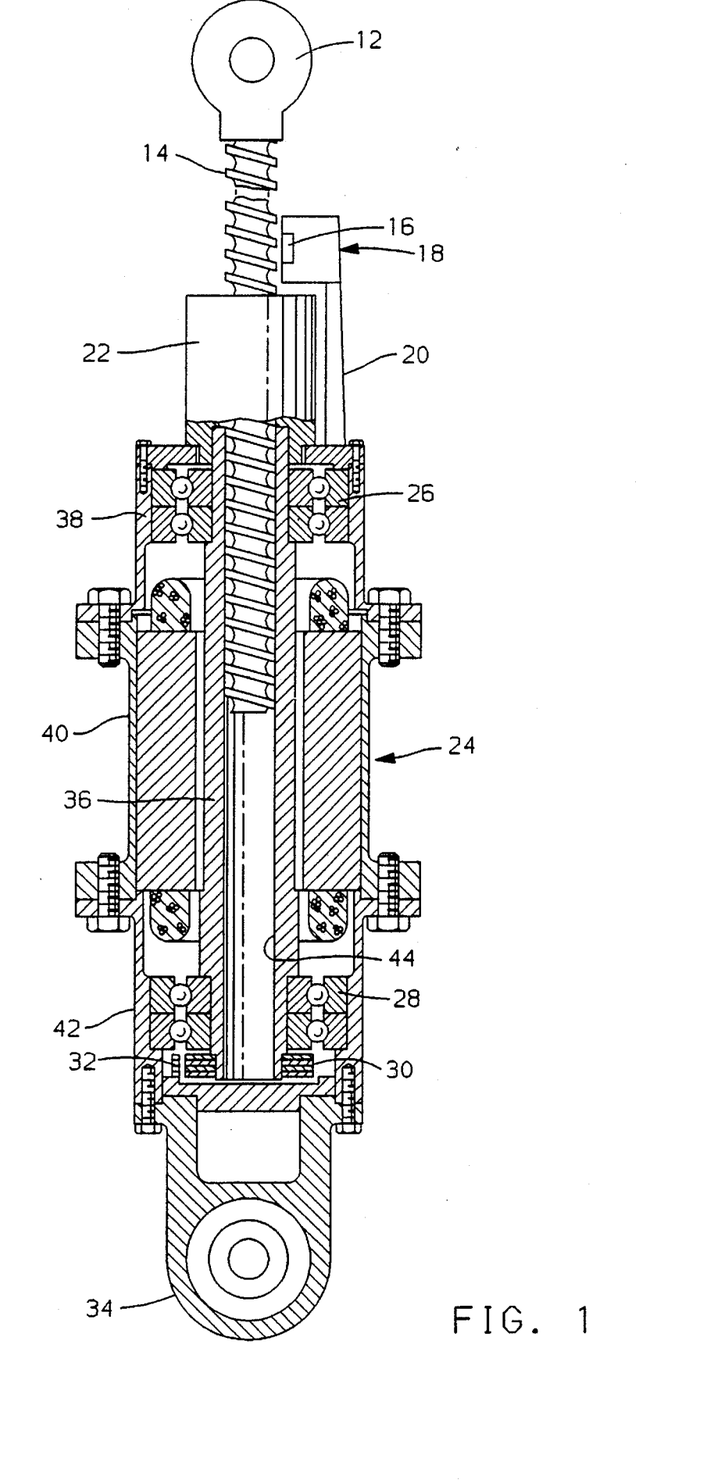
FIG. 1 illustrates an electromechanical suspension actuator implementing the sensor system according to this invention.

Referring to FIG. 1, the electromechanical actuator according to this invention includes wheel mount 12 attached to linearly translating screw 14, which is coupled through a ball nut transmission 22 to electric motor/alternator 24. The interaction of the ball nut 22 and screw 14 translates up and down movement of the actuator caused by forces applied to wheel mount 12 and chassis mount 34 into rotational movement of the motor/alternator 24. Thus, when the chassis mount 34 is mounted to the vehicle body and the wheel mount 12 is mounted to the vehicle wheel, normal suspension system movement causes the actuator to extend and retract in a linear movement (note, in the active suspension implementation, power supplied to the actuator may cause movement of the suspension). The linear movements are translated by the screw and ball nut into rotary movements of motor/alternator 24.

Ball nut 22 is coupled to hollow motor shaft 36 so that as ball nut 22 turns, hollow motor shaft 36 also turns, causing the motor/alternator 24 to turn. The hollow shaft 36 is rotatably mounted into the upper housing via bearing assembly 26 and is rotatably mounted within the lower housing 42 via lower bearing assembly 28. The tubular shaft 36 has a hollow tubular opening that receives screw body 14 when the actuator is retracted.

Hall effect sensors 32 provide pulses in response to the sensed rotational movement of rotary encoder 30. The pulses provided by Hall effect sensors 32 indicate relative rotary movement of motor/alternator 24 and are also representative of relative linear movement of the screw 14 with respect to motor/alternator 24. Because of the high gear ratio, a relatively low resolution of encoder 30 translates into a relatively high resolution of the position of screw 14 with respect to the motor/alternator 24.

In the case where motor/alternator 24 is a brushless DC motor, encoder 30 may also include in one single assembly several tracks designed to control the motor drive switching circuit. For instance, encoder 30 may be the type described in Research Disclosure 33824, published June, 1992, having a disclosure incorporated herein by reference. Preferably the rotary encoder 30 is then a four-track encoder wheel that provides commutation pulses and high resolution rotary position signals. The encoder may comprise four co-planar encoder discs, three commutation encoder discs and one high resolution encoder disc, all of them properly spaced and oriented with respect to each other and over-molded to form a solid rigid assembly that is attached to the motor shaft. In some applications, particularly if very high resolution is required, more than one high resolution encoder disk may be included in encoder 30.

The encoder of this type is intended for operation with a single package stationary sensor comprising four magnetic field sensitive devices, e.g., Hall effect sensors or magnetoresistors, spaced to match the spacing of the four co-planar encoder discs. The discs are made from a soft magnetic material, such as low carbon steel, using a precision blanking process and have a balanced peripheral shape to provide proper position information to the Hall effect sensors. In response to the output signals from the sensors, an inverter circuit is easily controlled in a known manner of controlling brushless DC motors to control output force of the actuator in accordance with commands developed by the controller.

Screw 14 has engraved thereon two small grooves 54 and 55 (see also FIG. 4) sensed by sensor head 18 including two magnetoresistive or Hall effect sensors 16 and 17. The sensor head 18 is mounted to support 20, which is rigidly attached to the upper housing 38 of the motor/alternator 24 through any suitable manner.

Figure 2:
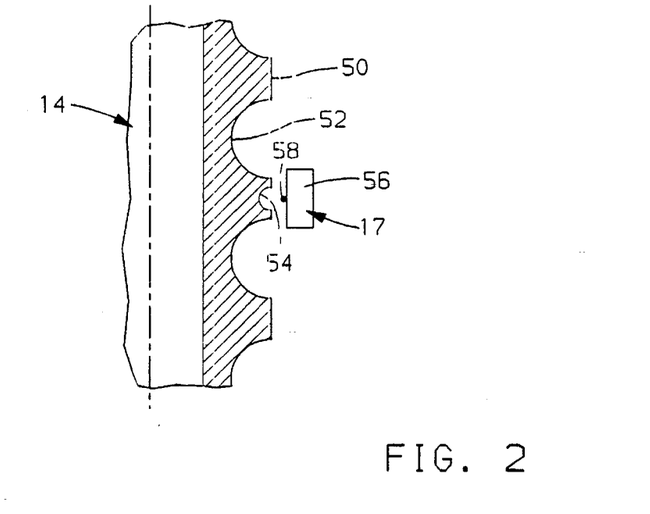
FIG. 2 is an illustration of the actuator screw according to this invention.
Figure 4:
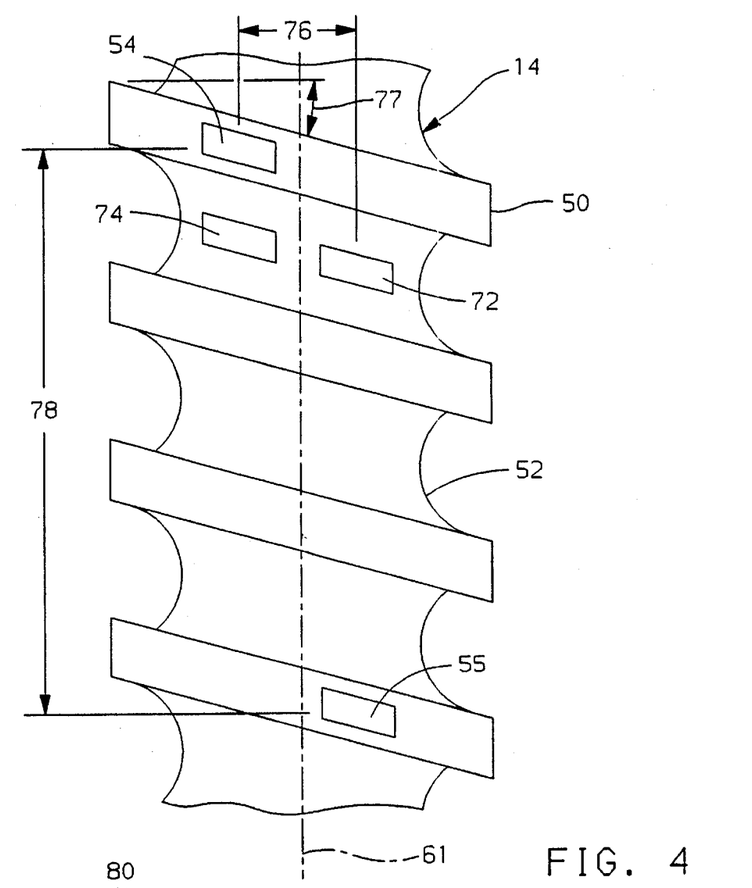
FIG. 4 illustrates an example sensor and groove configuration according to this invention.

Referring now to FIGS. 2 and 4, a portion of the screw 14 is shown, comprising a spiral combination of lands 50 and bearing grooves 52, which together track a set of bearings (not shown) in the ball nut 22 in a known manner. In two positions along the screw 14, small grooves 54 and 55 are made by removing a small amount of material in the screw land 50. Each of the small grooves may be detected by a magnetoresistive sensor 16, 17 including a magnet 56 and magnetoresistor 58, as shown, or by a Hall effect sensor. The magnetoresistive sensors 16, 17 are stationarily mounted facing the screw 14, as shown, to sense the vertical movement of the screw 14 and the passing of lands 50, bearing grooves 52, and the small grooves 54, 55 with vertical movement on the screw 14.

A magnetoresistive sensor such as the sensor 17 shown, provides a low output when a bearing groove 52 passes the sensor 17 and a high output when a land 50 passes the sensor 17. The small groove 54 is also detected by the sensor 17 to bring the sensor output lower. Because the flux density from the magnet decreases rapidly with air gap depth, the small groove 54 (or 55) in the land 50 need not be very deep to provide a significant drop in signal strength. For this reason, the groove can be made deep and large enough to be useful for sensing purposes, yet small enough to be insignificant for the proper operation of the screw mechanism and insignificant to the structural integrity of the screw.

Figure 3A:
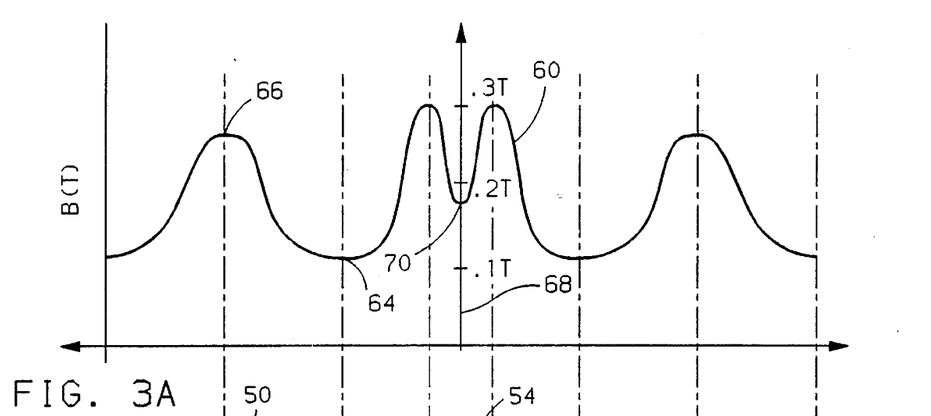
FIGS. 3a and 3b illustrate the operation of the absolute position sensor according to this invention.
Figure 3B:
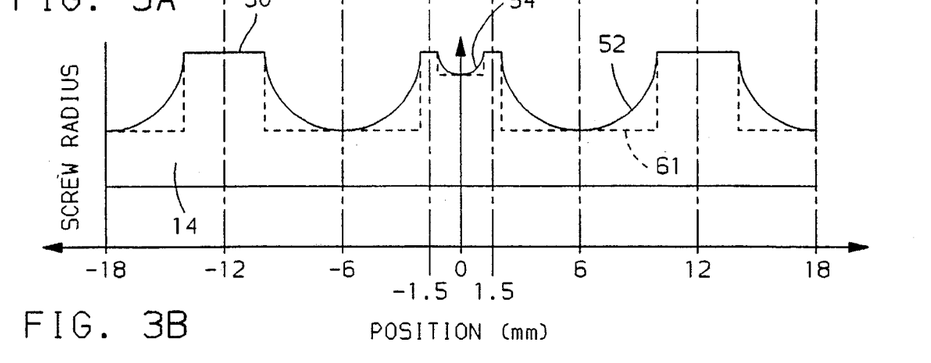

FIG. 3 illustrates flux densities calculated via finite element analysis for an air gap between the magnetoresistive sensor 17 and the screw 14, including a small groove 54 within land 50 measuring 1 mm. deep by 2 mm. wide. The contour 61 illustrates the approximation of the screw 14 used for the model.

As can be seen, the pattern of the flux density 60 in FIGS. 3a and 3b follows the surface pattern 61 of the approximated screw surface. High points 66 represent flux densities at lands, low points 64 represent flux densities in the large grooves and reference 70 represents the flux density at position 68, corresponding to the small groove 54. Reference 62 illustrates the mean flux density. The flux density drop across the small groove is significant, from 0.3 T down to 0.2 T, despite the small size of the groove. The plotted flux density is based on a magnetoresistive sensor comprising a hot pressed iron-neodymium-boron alloy permanent magnet of a known type (e.g., MQ2™), 3 mm. thick and 6 mm. wide.

In implementing this invention, it is possible to use one small groove at any position along the screw. However, the reference position would only be identified each time this groove passes the sensor, which may not happen for some time after start-up of the vehicle. On the other hand, placement of too many sensors and small grooves may become impractical from a cost standpoint. According to this invention, it is preferred that two sensors and two small grooves be used. In an example configuration, one small groove is sensed when the vehicle is in the static equilibrium position of the vehicle with an assumed average sized driver with no payload and the other small groove is sensed at the static equilibrium position of the vehicle fully loaded. This combination offers an appropriate compromise between obtaining absolute position information rapidly after power-up, on the one hand, and sensor proliferation, on the other hand. These two positions could be, for example, two inches apart and are denoted as the "zero position" and "two-inch position," respectively.

To eliminate difficulty in using each sensor singly and trying to distinguish between the large screw grooves and the small grooves in the lands, the two magnet sensor assemblies are connected according to this invention in a bridge configuration located at some angular distance 76 from one another, as shown in FIG. 4.

FIG. 4 illustrates a portion of screw 14 and small grooves 54 and 55 in the helical land 50 of the screw. The grooves 54 and 55 are, in this example, axially two inches apart, placed in the lands 50 so that, at static equilibrium position for the vehicle with only a driver and no payload, groove 55 is nominally at sensor position 72. At the static equilibrium position for the vehicle fully loaded, groove 54 is at sensor position 74, where the second sensor is located.

The small grooves 54 and 55 are located at an angular distance 76 azimuthally. The sensors are mounted at the sensor positions 72 and 74, which may be chosen as follows. The azimuthal angle between the sensor positions is the same as the azimuthal angle between the grooves 54 and 55. The sensors are located along an imaginary helix having the same helix angle 77 as the helical lands 50 of the screw 14. The helix angle 77 is defined as the angle of the helix of the screw land 50 with respect to an imaginary plane perpendicular to the screw axis 61. The sensors may either be co-linear along the imaginary helix or may be spaced axially apart in increments equal to the pitch or distance between the centers of consecutive lands of the screw. Thus, with a distance from center to center between consecutive lands of screw 14 equal to X mm., the axial distance between the sensors is nX mm. where n is an integer including 0, 1, 2, 3, etc..

By placing the sensors either co-linearly along the helix or at multiples of the pitch distance apart helically, the two sensors have identical outputs as the screw moves past the sensors until groove 54 passes sensor position 74 or until groove 55 passes sensor position 72. Because, in this example, the screw 14 does not rotate about its axis, there is no chance of groove 54 triggering the sensor at position 72 nor of groove 55 triggering the sensor at position 74.

Figures 5, 6:
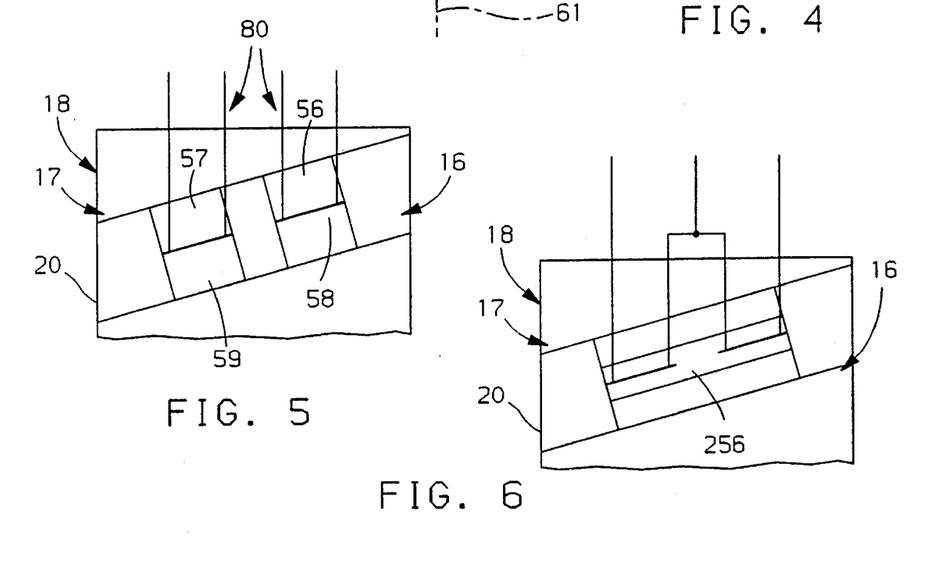
FIG. 5 illustrates an example sensor according to this invention.
FIG. 6 illustrates a second example sensor according to this invention.

Referring now to FIG. 5, a face view is shown of the portion of the sensor assembly 18 that faces the screw 14. The sensor assembly 18 includes sensors 16 and 17 comprising magnets 57 and 56 respectively and magnetoresistive elements 59 and 58, respectively, as shown. Leads 80 are provided to connect the sensor assembly to a control unit. When mounted facing the screw 14, sensor assembly 18 places the sensors 16 and 17 at their sensor positions 72 and 74 respectively.

Referring to FIG. 6, advantageously, only one magnet 256 may be used with magnetoresistive elements 59' and 58' mounted thereon. This method simplifies assembly, allows the use of a common lead frame to support the magnet, leads and the two magnetoresistors and reduces the number of leads to a total of three. However, the total volume of the magnet is larger than the total volume of magnets 56 and 57 shown in FIG. 5.

Figure 7A:
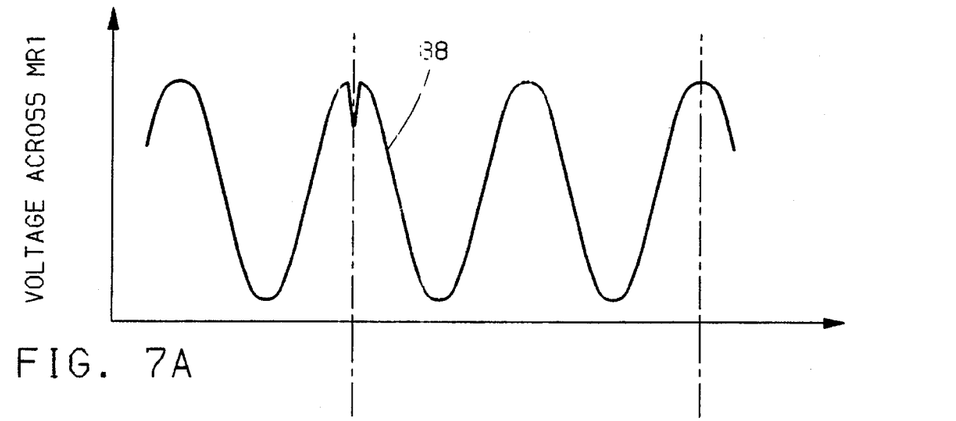
FIGS. 7a, 7b and 7c illustrate sensor and bridge circuit outputs according to this invention.
Figure 7B:
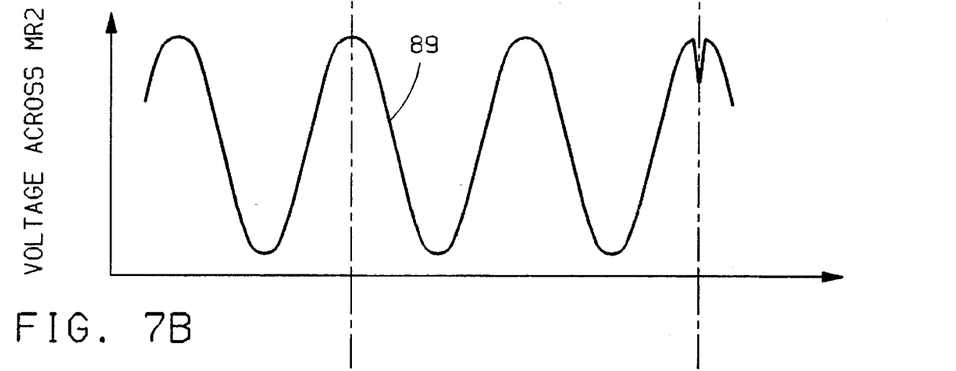
Figure 7C:
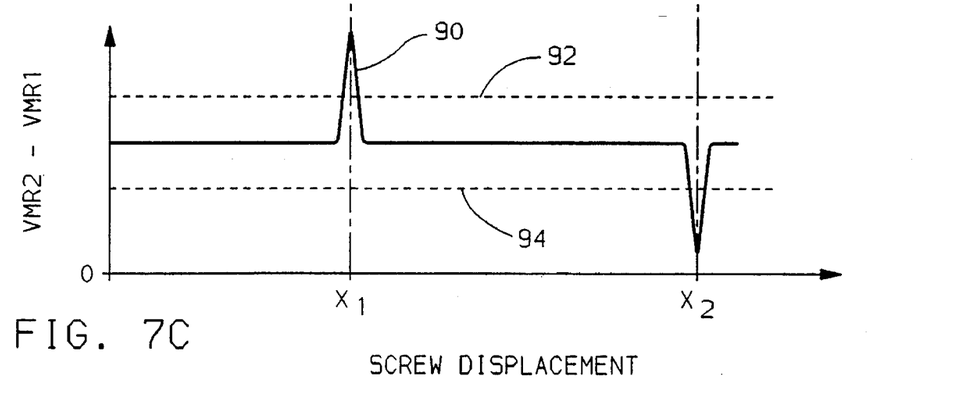

Referring to FIGS. 7a, 7b and 7c, reference 88 represents the output signal of sensor 16, reference 89 represents the output signal of sensor 17 and reference 90 represents the output signal of a bridge circuit (described in more detail below) including the two sensors 16 and 17. As shown, when the screw 14 is at displacement position x1 (the zero position), trace 88 dips. While the screw 14 is at displacement position x2, trace 89 dips. Otherwise, the outputs of the two sensors 16 and 17 are identical, as shown.

With the two sensors 16 and 17 connected in a bridge configuration, the output trace 90 of the bridge circuit appears as shown. When the screw reaches the zero position, sensor 55 is triggered and the output of the bridge circuit goes high, as shown. When the screw 14 reaches the two inch position, sensor 56 is triggered and the output of the bridge circuit goes low, as shown. By connecting the bridge circuit to a trigger having high and low thresholds 92 and 94, the bridge circuit can be used to provide two absolute position output signals. The output of the bridge and trigger circuit would then be as follows, when the actuator extends to a first predetermined position, the bridge circuit goes high and a first absolute position signals is provided. When the actuator extends to a second predetermined position, the bridge circuit goes low and a second absolute position signal is provided. When the actuator is extended to positions other than the first and second predetermined positions, the bridge circuit remains at its neutral value and no absolute position signal is provided.

Figure 8:
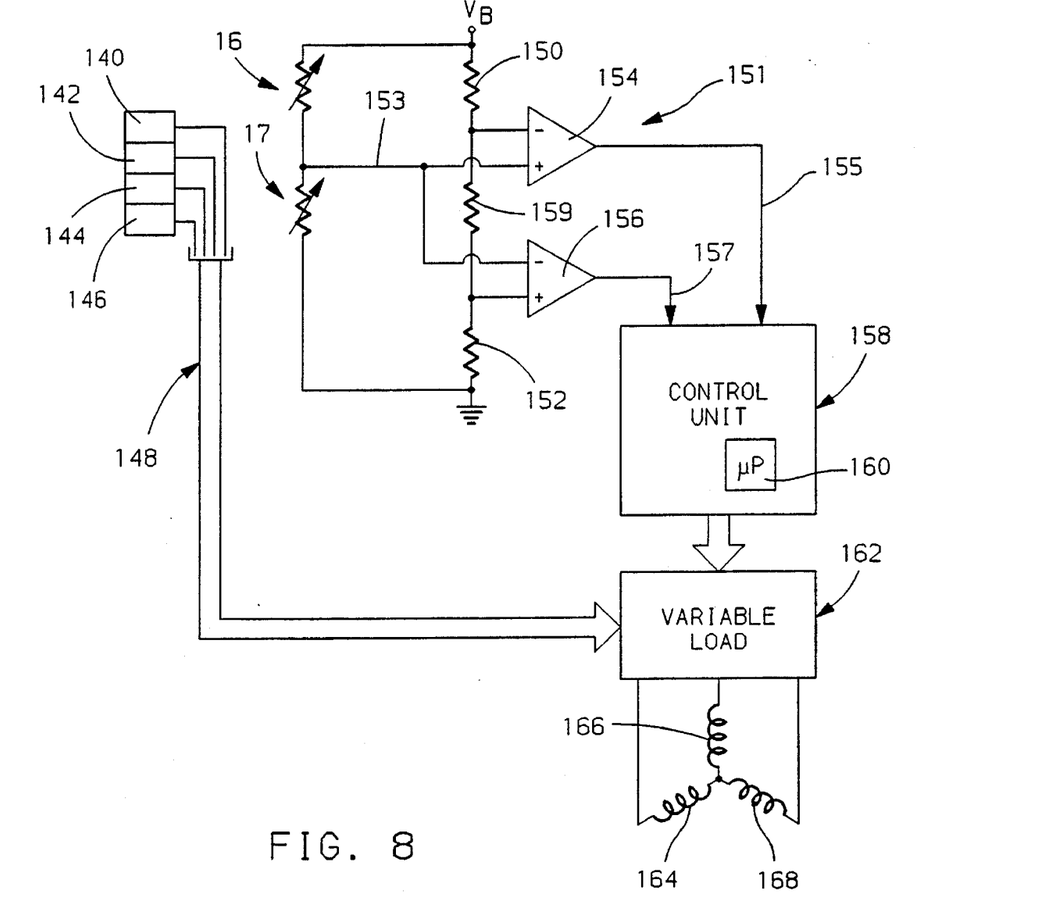
FIG. 8 illustrates this invention schematically, including a sensor bridge circuit.

Referring now to FIG. 8, a bridge and trigger circuit 151 for use with sensors 16 and 17 is shown in the schematic diagram for a control system for implementation of this invention. The sensors 16 and 17 are connected in series between the vehicle supply voltage and ground. Line 153, coupled to the junction of sensors 16 and 17, is provided to the inverting input of amplifier 156 and the non-inverting input of amplifier 154. The other inputs of amplifiers 154 and 156 are biased by resistors 150, 152 and 159, coupled in series between the vehicle supply voltage and ground, as shown. The purpose of resistor 159 is to set a non-zero threshold, delta-v, as shown in FIG. 7.

The value of resistors 150, 152 and 159 control the trigger levels of amplifiers 154 and 156 so that when the value of line 153 goes high, above a first threshold, an output signal appears on line 155 indicating that the first reference position is sensed. When line 153 falls below a second threshold, an output signal is triggered on line 157, indicating that the second reference position is sensed. Thus, each time that screw 14 is extended to the first reference position, an output signal appears on line 155. Each time that screw 14 is extended to the second reference position, an output signal appears on line 157. When the screw is not at either the first or second reference positions, no output signal appears on lines 155 or 157.

The signals on lines 155 and 157, along with the signals on bus 148 from sensors 140, 142, 144 and 146 proximate to encoder 30 are provided to control unit 158 of a known type that typically includes a microprocessor 160 and RAM and ROM. Sensors 140, 142, 144 and 146 each correspond to one of the discs in the rotary encoder 30 so that sensors 140, 142 and 144 provide commutation control pulses and so that the sensor 146 provides high resolution pulses from the high resolution encoder disc.

In the event that the actuator is to be used only as a generator and not as a motor, i.e., in a semi-active suspension control implementation, then only sensor 146 is needed as the commutation control pulses by sensors 140, 142 and 144 are not necessary. In the active suspension system case where the actuator is controlled as both a generator and a motor, then the commutation control pulses provided by sensors 140, 142 and 144 are necessary in as long as the motor/alternator 24 is a brushless DC motor.

The control unit receives the signals from bus 148 and from lines 155 and 157 and determines a relative displacement between the vehicle wheel and body as follows. A signal on line 155 indicates absolutely that the relative displacement between the body and wheel corresponds to the actuator being extended to the zero position. Thus control unit 158 updates the relative displacement signal so that the relative displacement signal corresponds to the zero position, if it does not already correspond to the zero position. A signal on line 157 indicates absolutely that the relative displacement between the body and wheel corresponds to the actuator being extended to the two inch position. Thus control unit 158 updates the relative displacement signal so that the relative displacement signal corresponds to the two inch position, if it does not already correspond to the two inch position. When the control unit 158 is not receiving signals on lines 155 or 157, the control unit 158 counts pulses received from sensor 146 and adds or subtracts a proper increment to the position signal maintained in memory in control unit 158.

Each time that screw 14 extends or retracts to the first predetermined position (i.e., the zero position), a pulse appears on line 155. Each time that screw 14 extends or retracts to the second predetermined position (i.e., the two inch position), a pulse appears on line 157. When the actuator screw is not extended or retracted to one of the predetermined positions, no absolute position signals are provided. Thus, with each pulse on lines 155 or 157, the position signal is reset to either the zero reference position or the two inch reference position and when pulses are not received on lines 155 or 157, the control unit 158 counts up or counts down with proper increments responsive to signals received from sensor 146.

Using the above information, one skilled in the art can easily determine relative displacement between the body and wheel using the actuator of this invention. The relative displacement may be determined with the customized circuitry dedicated to monitoring the signals on lines 155, 157 and bus 148 to determine a relative displacement signal. Alternatively, lines 155, 157 and bus 158 may be provided directly to microprocessor 160, which may be programmed to count the relative movement pulses from sensor 146, updating the relative displacement signal in response thereto, and resetting the relative displacement signal to the appropriate values each time an absolute position on lines 155 or 157 is provided. Those skilled in the art can implement either method and further detail need not be set forth herein.

Once the relative displacement signal is determined as described above, the control for the suspension system can be implemented in the manner described in the above-described patent and co-pending applications or in any other suitable manner known to those skilled in the art. The control unit determines appropriate control commands and applies those control commands to the variable load 162, which applies a load across coils 164, 166, 168 when the actuator is used as a variable damper to control the damping force of the actuator. An example variable load is described in U.S. Pat. No. 4,815,575, assigned to assignee of this invention and having a disclosure incorporated herein by reference.

Implementation of this invention into known control schemes allows elimination of the prior used position sensing device, such as the LVDT.

Figure 9:
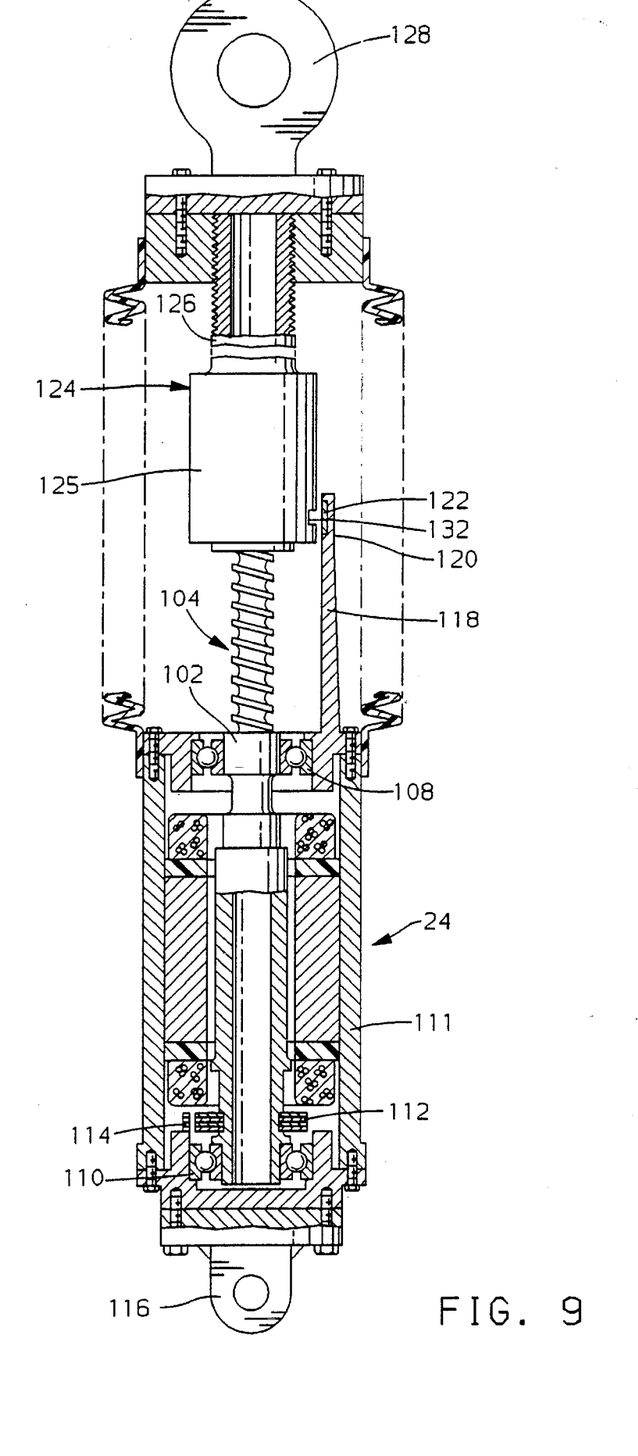
FIGS. 9 and 10 illustrate a second example actuator according to this invention.

Referring now to FIG. 9, a second example actuator with position sensing according to this invention is shown. The actuator includes a wheel mount 128 coupled through a tubular support 126 to ball nut 124. The wheel mount 128 is mounted to the vehicle wheel and the chassis mount 116 is mounted to the vehicle chassis. The ball nut 124, tubular support 126 and wheel support 128 extend and retract linearly with respect to motor/alternator 24 in response to normal suspension system movements. The linear extension and retraction of the actuator translate into rotational motion of the screw 104 coupled to motor/alternator 24, which is mounted within bearings 108 and 110 in the housing 111 shown.

The motor/alternator 24 includes a rotary encoder 112 for use with Hall effect/magnetoresistive sensors 114 to detect relative rotational movement of motor/alternator 24. Support 118 supporting sensor head 120 is mounted to the housing 111 of motor/alternator 24. Sensor head 120 includes sensors 122 (only one shown) of similar type and positioning as the sensors described above with reference to FIGS. 4, 5 and 6.

The outer housing 125 of the ball nut 124 includes two grooves 130 and 132 (see also FIG. 10) having relative axial and radial distances apart similar to the grooves 54 and 55 illustrated in FIG. 4 (since the ball nut does not include a helical structure the limitations relating to the helix need not apply). Interaction of the grooves 127 and sensors 122, which are connected in a bridge circuit as described above, provides two absolute position reference signals for the actuator shown.

Figure 10:
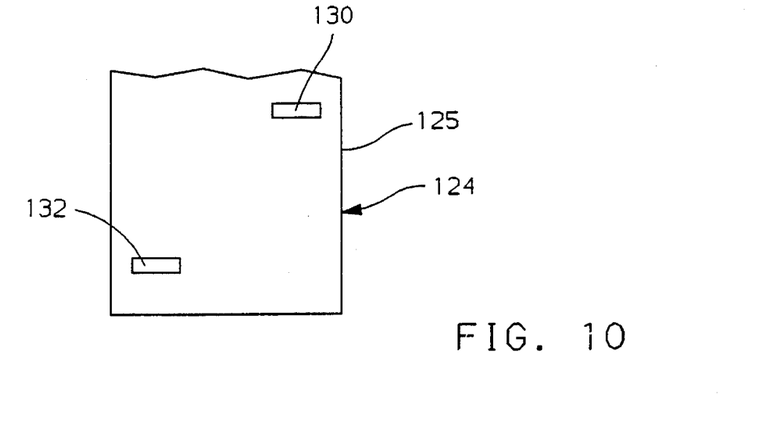

FIG. 10 illustrates the grooves 130 and 132 and the outer housing 125 of ball nut 124.

Advantageously, according to this invention, the absolute positions sensors can be implemented to provide absolute position signals anywhere along the range of linear travel of the linearly translating portion of the actuator. This provides an advantage over systems that must bottom or top out to obtain an absolute position reference.

In implementing this invention, any number or location of the absolute position sensors may be used, as a system designer desires.

The above-described implementations of this invention are example implementations. Various other improvements, modifications to this invention may occur to those skilled in the art and such improvements and modifications will fall within the scope of this invention as set forth below.

The embodiments of the invention in which an exclusive property or privilege is claimed are defined as follows:

1. An apparatus comprising:

a rotating element;

a linearly moving element;

a rotary to linear converter coupled to the rotating element and the linearly moving element, wherein the rotary to linear converter translates linear movement of the linearly moving element to rotary movement of the rotating element;

means for determining relative movement of the rotating element;

first and second grooves in the linearly moving element, the first and second grooves separated azimuthally by a predetermined angle greater than zero and vertically by a predetermined distance;

first and second sensors separated azimuthally by the predetermined angle wherein the first sensor responds to proximity of the first groove and the second sensor responds to proximity of the second groove, wherein the first and second sensors are coupled in a bridge comprising means for providing an output signal having (a) a first state when neither the first nor the second groove is proximate to either the first or the second sensor, (b) a second state when the first groove is proximate to the first sensor, and (c) a third state when the second groove is proximate to the second sensor.

2. The apparatus set forth in claim 1 wherein the linearly moving element comprises a screw having a helical land at a fixed land angle;

the first and second grooves are located in the helical land; and the first and second sensors are located co-linearly along a helical spiral facing the helical land.

3. The apparatus set forth in claim 1 wherein the linearly moving element comprises a screw having a helical land and wherein the first and second sensors have an axial distance apart equal to a whole integer multiple of a distance between consecutive centers of lands of the screw.

4. A suspension system actuator comprising:

a linearly translating element;

a rotary to linear converter mechanically connected to the linearly translating element;

a rotating element mechanically connected to the rotary to linear convertor so that extension and retraction of the linearly translating element translates to rotation of the rotating element, wherein the rotating element includes a brushless motor/alternator including a rotary encoder and a corresponding sensor device providing an indication of relative motor rotation and therefore of linear travel of the linearly translating element, wherein the indication of relative motor rotation is subject to driftover time;

a sensor assembly providing at least one reference signal indicative of a predetermined linear position of the linearly translating element, the sensor assembly mounted across an air gap from the linearly translating element, wherein the sensor assembly, rotary encoder, motor/alternator, and linearly translating element comprise an integral unit that provides a controllable variable force, continuous relative movement signals, and at least one absolute position signal when the linearly translating element reaches the predetermined position, wherein the absolute position signal is used to correct for drift of the relative movement signal.

5. The suspension system actuator set forth in claim 4, wherein the sensor assembly includes two separate sensors, mounted across an air-gap from the linearly translating element, the two sensors coupled to form a bridge circuit, wherein two locations of the translating members each include a small groove for triggering one of the sensors, one groove triggers one sensor at a first reference position and the other groove triggering the second sensor at a second reference position.

* * * * *